(12) United States Patent
Dsouza et al.

(10) Patent No.: US 9,786,055 B1
(45) Date of Patent: Oct. 10, 2017

(54) METHOD AND APPARATUS FOR REAL-TIME MATTING USING LOCAL COLOR ESTIMATION AND PROPAGATION

(71) Applicant: ADOBE SYSTEMS INCORPORATED, San Jose, CA (US)

(72) Inventors: Renzil Leith Dsouza, Karnataka (IN); Siddhant Jain, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/083,749

(22) Filed: Mar. 29, 2016

(51) Int. Cl.
    G06K 9/34       (2006.01)
    H04N 9/74       (2006.01)
    G06T 7/00       (2017.01)
    G06T 7/40       (2017.01)

(52) U.S. Cl.
    CPC .......... *G06T 7/0079* (2013.01); *G06T 7/0083* (2013.01); *G06T 7/408* (2013.01); *G06T 2207/10024* (2013.01); *G06T 2207/20144* (2013.01)

(58) Field of Classification Search
    CPC .... G06T 7/10; G06T 7/90; G06T 7/12; G06T 2207/100024; G06T 7/194; G06T 7/0081; G06T 7/408; G06K 9/4652
    USPC .... 382/100, 164, 162, 173, 232; 348/42, 44, 348/587, 586; 345/418, 419, 629, 634, 345/589
    See application file for complete search history.

(56) References Cited

U.S. PATENT DOCUMENTS

| 6,741,755 | B1 * | 5/2004  | Blake   | G06T 5/30   |
|           |      |         |         | 382/257     |
| 7,599,555 | B2 * | 10/2009 | McGuire | H04N 5/272  |
|           |      |         |         | 382/173     |
| 8,320,666 | B2 * | 11/2012 | Gong    | G06T 7/11   |
|           |      |         |         | 382/164     |
| 8,478,072 | B2 * | 7/2013  | Aisaka  | G06T 11/60  |
|           |      |         |         | 358/450     |
| 8,625,888 | B2 * | 1/2014  | Sun     | G06T 7/194  |
|           |      |         |         | 382/164     |
| 8,625,896 | B2 * | 1/2014  | Yang    | G06T 11/001 |
|           |      |         |         | 348/159     |
| 8,884,980 | B2 * | 11/2014 | Mallick | G06T 11/001 |
|           |      |         |         | 345/593     |

* cited by examiner

*Primary Examiner* — Sheela C Chawan
(74) *Attorney, Agent, or Firm* — Shook, Hardy & Bacon L.L.P.

(57) ABSTRACT

Embodiments of the present invention provide systems, methods, and computer storage media directed to operations to facilitate real-time matting using local color estimation and propagation. In accordance with embodiments described herein, an unknown region is estimated based on a set of received boundary points (a zero-level contour that separates the foreground object from the background) and additional contours based on increasing distances from the zero-level contour. The background and foreground colors for each pixel in the unknown region can be estimated and utilized to propagate the foreground and background colors to the appropriate contours in the unknown region. The estimated background and foreground colors may also be utilized to determine the opacity and true background and foreground colors for each pixel in the unknown region which results in an image matted in real-time.

19 Claims, 18 Drawing Sheets

METHOD AND APPARATUS FOR REAL-TIME MATTING USING LOCAL COLOR ESTIMATION AND PROPAGATION

BACKGROUND

Accurately separating a foreground image from background image requires estimating full and partial pixel coverage, a process referred to as matting. Matting is often used to separate a foreground image (such as a person) from a background image (such as a particular setting). This process can be difficult because pixels in an unknown region (the area around the boundary of a foreground object and the background in an image) are a blend of foreground and background colors. Estimating the opacity and true background and foreground colors in the unknown region to give the combined image a smooth and blended appearance is the goal of matting.

Studio quality matting can be achieved in a professional studio (e.g., a Hollywood movie set) utilizing a very large, single-colored background screen. The background can be any color that is uniform and distinct, but green and blue backgrounds are most commonly used. The actor or person being filmed in front of the screen cannot wear clothing that is similar in color to the screen or the matting process may not work properly. Unfortunately, such a large, single-colored background screen is impractical for a home studio (or any user that lacks the professional skills and resources typical in a professional studio). Further, when a foreground is against a solid colored background (e.g., a green screen), the light being reflected from the background can contaminate the foreground, creating a "halo" of the background colors along the edges of the foreground. The process of despillling refers to removing the artifacts from the foreground by estimating the true foreground color for the pixels.

SUMMARY

Embodiments of the present invention relate to facilitating real-time matting using local color estimation and propagation. As described in embodiments herein, an unknown region is estimated based on a set of received boundary points (a zero-level contour that separates the foreground object from the background) and additional contours based on increasing distances from the zero-level contour. Pixels inside the unknown region are often a blend of both foreground and background colors (for example, thin strands of hair). By applying the technique described herein, the background and foreground colors for each pixel in the unknown region can be estimated and utilized to propagate the foreground and background colors to the appropriate contours in the unknown region. The estimated background and foreground colors may also be utilized to determine the opacity and true background and foreground colors for each pixel in the unknown region which results in an image matted in real-time.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
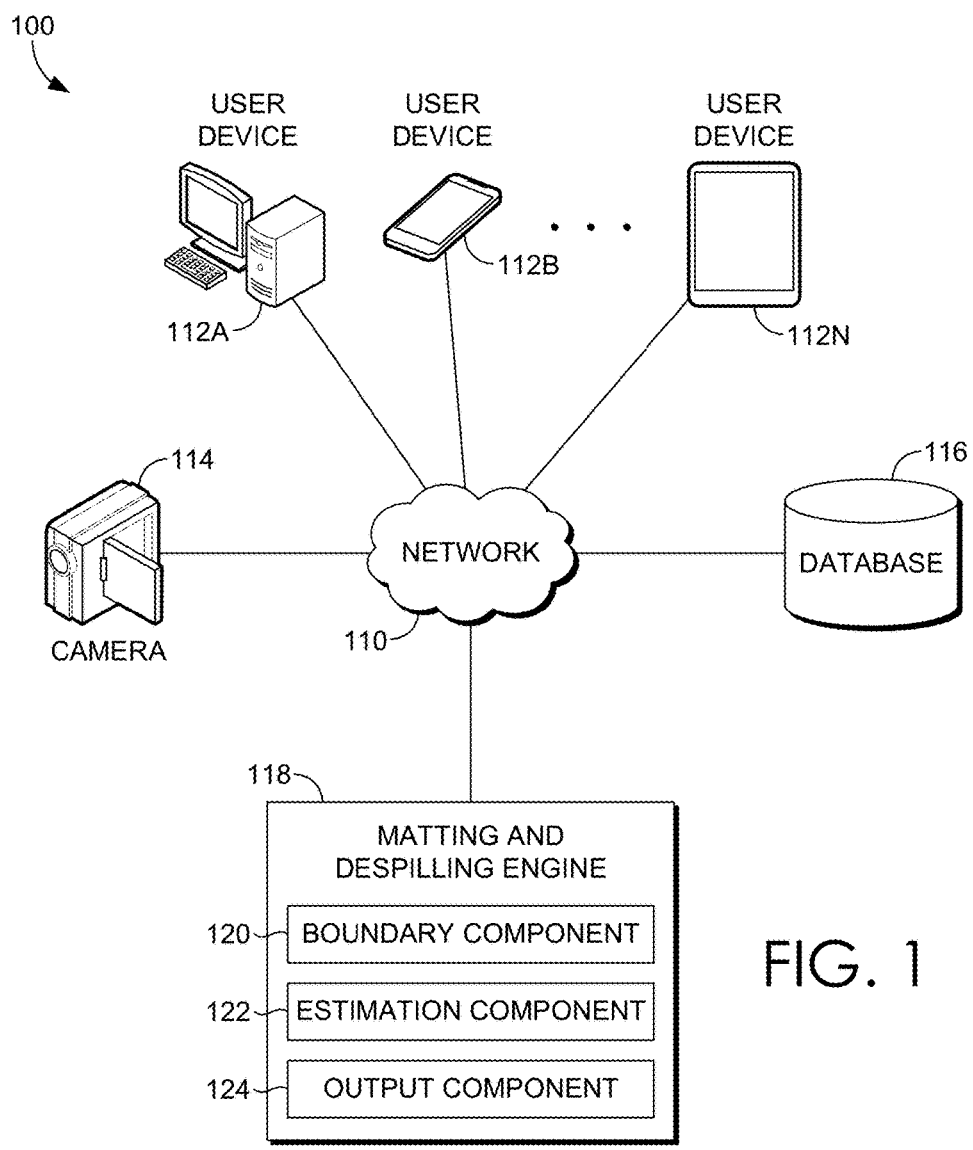
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to facilitating real-time matting using local color estimation and propagation. In particular, embodiments of the present invention enable an ordinary user (e.g., a person utilizing a computing device without the need for sophisticated studio quality equipment or a green screen) to blend various image elements (e.g., a foreground of an image with different backgrounds) in real-time and in high quality. Because pixels along a region where the background meets the foreground (i.e., the unknown region) are often a blend of both foreground and background colors (for example, thin strands of hair), the technique described herein enables the background and foreground colors for each pixel in the unknown region to be estimated. These estimated background and foreground colors can be utilized to propagate the foreground and background colors to the appropriate contours in the unknown region. The estimated background and foreground colors may also be utilized to determine the opacity and true background and foreground colors for each pixel in the unknown region which results in an image with combined foreground and background elements blended or matted in real-time. Consequently, a user in a home-studio, without the benefit of a sophisticated studio quality equipment or a green screen can, in real-time, create images or videos that replaces the background with a desired background. In this way, the user may create a high-quality image or video having a particular foreground subject combined with any background the user desires. For example, the user can create videos that include the user speaking in front of a national monument, at the beach, in the mountains, near famous people, and the like.

To do so, at a high level, an unknown region (the area between a foreground object and the background in an image) is initially estimated based on a set of received boundary points (a zero-level contour that separates the foreground object from the background). Background and foreground contours (of the zero-level contour) are generated based on a contour traversal of increasing distances from the set of boundary points. Using local samples taken from the neighboring pixels in the outermost background contours, the true background colors can be estimated for each of the pixels in the outermost contour. Similarly, using the neighboring pixels in the innermost foreground contours, true foreground colors can be estimated for each of the pixels in the innermost contour. Each of the true background colors and the true foreground colors are propagated to the unknown region to estimate the background and foreground colors for all pixels in the unknown region. These estimates ultimately produce the matte for the image in real-time.

Turning now to FIG. 1, a block diagram is provided illustrating an exemplary environment 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the environment 100 may include user device(s) 112A-112N, camera 114, database 116, and matting and despilling engine 118. It should be understood that the environment 100 shown in FIG. 1 is an example of one suitable computing system environment. Each of the components shown in FIG. 1 may be implemented via any type of computing device, such as computing device 1900 described with reference to FIG. 19, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of user devices, cameras, databases, and matting and despilling engines may be employed within the computing environment 100 within the scope of the present invention. Each may comprise a single device or multiple devices cooperating in a distributed environment. For instance, the matting and despilling engine 118 may be provided via multiple devices arranged in a distributed environment that collectively provide the functionality described herein. Additionally, other components not shown may also be included within the network environment.

The user device(s) 112A-112N may be any type of device suitable for facilitating real-time matting of an image. Such computing devices may include, without limitation, a computer such as computing device 1900 described below with reference to FIG. 19. For instance, the user device 112 may be a desktop computer, a laptop computer, a tablet computer, a mobile device, or any other device having network access. As shown, the user device(s) 112A-112N can include a display screen configured to display information to the user of the user device(s) 112A-112N, for instance, information relevant to facilitating real-time matting of an image.

Generally, a user may employ the user device(s) 112A-112N to communicate with camera 114, database 116, and/or matting and despilling engine 118 and initiate real-time matting of an image. The image may be captured by camera 114, user device(s) 112A-112N, or stored by user device(s) 112A-112N or database 116. Components of the matting and despilling engine 118 can be in any form being executed on the user device(s) 112A-112N. For instance, the matting and despilling engine 118 can operate by way of a web browser executing on user device(s) 112A-112N or as an application, or portion thereof, being executed on the user device(s) 112A-112N.

The camera 114 may be any type of device capable of capturing images or video. Although the camera is depicted in FIG. 1 as a separate device, it is contemplated each of the user device(s) 112A-112N may include a camera. Further, although the camera is depicted in communication with each of the components in FIG. 1 via network 110, it is contemplated that the images or video may be communicated directly to user device(s) 112A-112N rather than via network 110. As described in more detail below, images or video captured by the camera 114 may be matted in real-time by matting and despilling engine 118.

The database 116 may be any type of server device capable of hosting one or more images, videos, and the like, and serving the one or more images, videos, and the like, to computing devices, such as the user device 11 user device(s) 112A-112N or matting and despilling engine 118. By way of example, and not limitation, the database 116 may be a server maintaining one or more backgrounds that a user can combine with one or more foregrounds captured by camera 114 by utilizing matting and despilling engine 118.

As described in more detail below, the matting and despilling engine 118 can facilitate real-time matting of an image. Although the matting and despilling engine 118 is described as facilitating real-time matting of an image, it is contemplated that a user may employ the matting and despilling engine 118 to facilitate real-time matting of a video. Upon generation of a matted image or video, the matted image or video can be presented via the user device(s) 112A-112N.

Components of the matting and despilling engine 118 may include, without limitation, a processing unit, internal system memory, and a suitable system bus for coupling various system components, including one or more data stores for storing information (e.g., files and metadata associated therewith). The matting and despilling engine 118 typically includes, or has access to, a variety of computer-readable media. By way of example, and not limitation, computer-readable media may include computer-storage media and communication media. The computing system environment 100 is merely exemplary. While the matting and despilling engine 118 is illustrated as a single unit, one skilled in the art will appreciate that the matting and despilling engine 118 is scalable. For example, the matting and despilling engine 118 may in actuality include a plurality of computing devices in communication with one another. The single unit depictions are meant for clarity, not to limit the scope of embodiments in any form. As another example, the components described herein can be included in the user device such that the user device performs, e.g., via an integrated matting and despilling engine, the functionality of real-time matting of an image.

As already mentioned, the matting and despilling engine 118 is generally configured to facilitate real-time matting of an image. Typically, matting and despilling engine 118 communicates with the camera 114, user device(s) 112A-112N, and/or database 116 to receive an image having a segmentation boundary between the foreground and background of the image and create a new image with a new background in real-time. In accordance with embodiments described herein, the matting and despilling engine 118 can include a boundary component 120, an estimation component 122, and an output component 124. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules may be implemented as stand-alone applications. In other embodiments, one or more of the illustrated components/modules may be integrated directly into the operating system of the matting and despilling engine 118. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the matting and despilling engine 118 might reside on a server, cluster of servers, or a computing device remote from or integrated with one or more of the remaining components.

The matting and despilling engine 118 may be any type of computing device, or incorporated into a computing device, that can access a network (e.g., network 110). For instance, the matting and despilling engine 118 may be a desktop computer, a laptop computer, a tablet computer, a mobile device, a server, or any other device, or portion thereof, having network access. In some embodiments, the matting and despilling engine 118 is provided by the user device(s) 112A-112N. Generally, a user may employ the matting and despilling engine 118 via the user device 112 to, among other things, create new images or videos by combining a foreground from a first image or video with a background from a second image or video.

To illustrate the above example, a user may have an image containing a particular foreground object (e.g., a child). The image may have a background that is not ideal or may include unwanted objects. However, utilizing the matting and despilling engine 118, the particular foreground object may be combined with any background in real-time to create a new image. In another example, a user may be involved in a video presentation or a video conference. The user may be in an office that is messy and does not want viewers of the video presentation or participants of the video conference to see the messy office. Accordingly, the user may employ the matting and despilling engine 118 to capture the user (i.e., the foreground object) in a new background (e.g., a clean office) in real-time to provide the appearance to the viewers or participants that the user is actually in a clean office.

As previously mentioned, in embodiments, the matting and despilling engine 118 includes a boundary component 120, an estimation component 122, and an output component 124 to facilitate real-time matting of an image. In particular, the matting and despilling engine 118 communicates with the camera 114, user device(s) 112A-112N, and/or database 116 to receive an image having a segmentation boundary between the foreground and background of the image, such as by using a video compositing, motion graphics design, and animation tool (e.g., ADOBE After Effects). The matting and despilling engine 118 may also communicate with the camera 114, user device(s) 112A-112N, and/or database 116 to receive a background that will be matted with the foreground to create a new image. Once the foreground and the background have been received, the matting and despilling engine 118 combines them to create the new image.

The boundary component 120 is generally configured to generate points of a bound on either side of the segmentation boundary. After the set of boundary points has been received that separates the foreground from the background of an image, boundary component 120 generates points of a band (i.e., the unknown band) by expanding and contracting the boundary points of the segmentation in the background and foreground regions. A matting radius, configurable by a user, defines the extent of the expansion/contraction used in the algorithm to generate the points.

Figure 2:
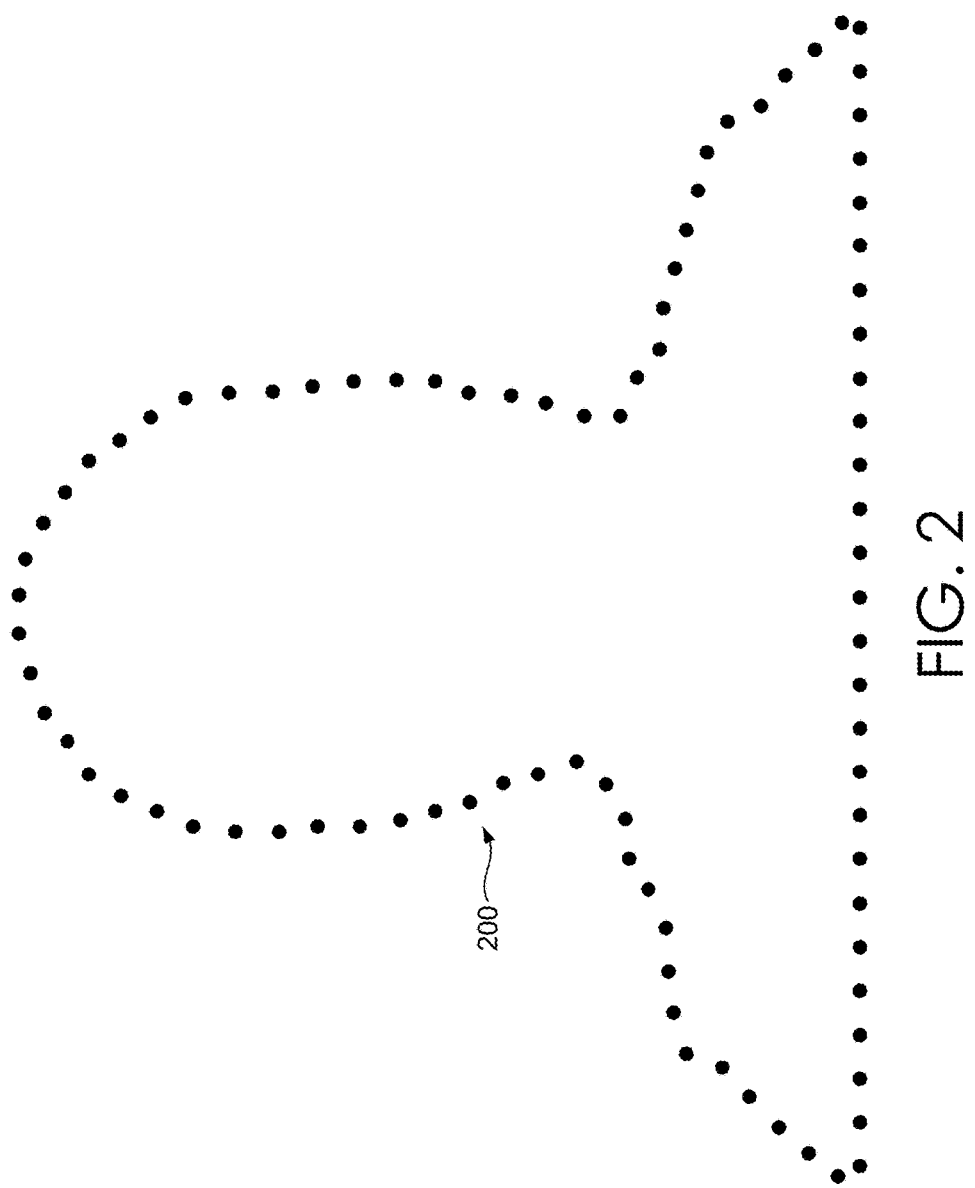
FIGS. 2-13 are exemplary diagrams illustrating the generation of points of a band by expanding and contracting the boundary points of the segmentation in the background and foreground regions of an image, in accordance with embodiments of the present invention.

In some embodiments, the points are generated first in the background region and then in the foreground region. In other embodiments, the points are generated first in the foreground region and then in the background region. Background points may be generated utilizing the following algorithm:

Initialize currentPostProcessPoints with segmentation boundary points
Add currentPostProcessPoints to contours_of_postProcessPoints_Bg*
  Initialize distance to 1
  Repeat until distance=matting_radius
  Initialize nextPostProcessPoints as an empty list
  For point in currentPostProcessPoints
    for neighbor_point in the immediate 8 membered neighborhood
      if neighbor_point is not visited and neighbor_point is a background point*
        a. Add neighbor_point to nextPostProcessPoints
        b. Add neighbor_point as a child of point
        c. Mark neighbor_point as a visited point
    Increase distance by 1
  set currentPostProcessPoints to nextPostProcessPoints
  add nextPostProcessPoints to contours_of_postProcessPoints_Bg at distance
  End repeat When points are generated in the foreground region, only those neighbor points are added to nextPostProcessPoints which are foreground points. The result may be stored in contours_of_postProcessPoints_Fg. Referring now to FIGS. 2-7, the process of generating the band is illustrated. As shown in FIG. 2, the initial set of boundary points 200 is received. The initial set of boundary points 200 represents the contour of the foreground object (in this example, a silhouette of a person).

Figure 3:
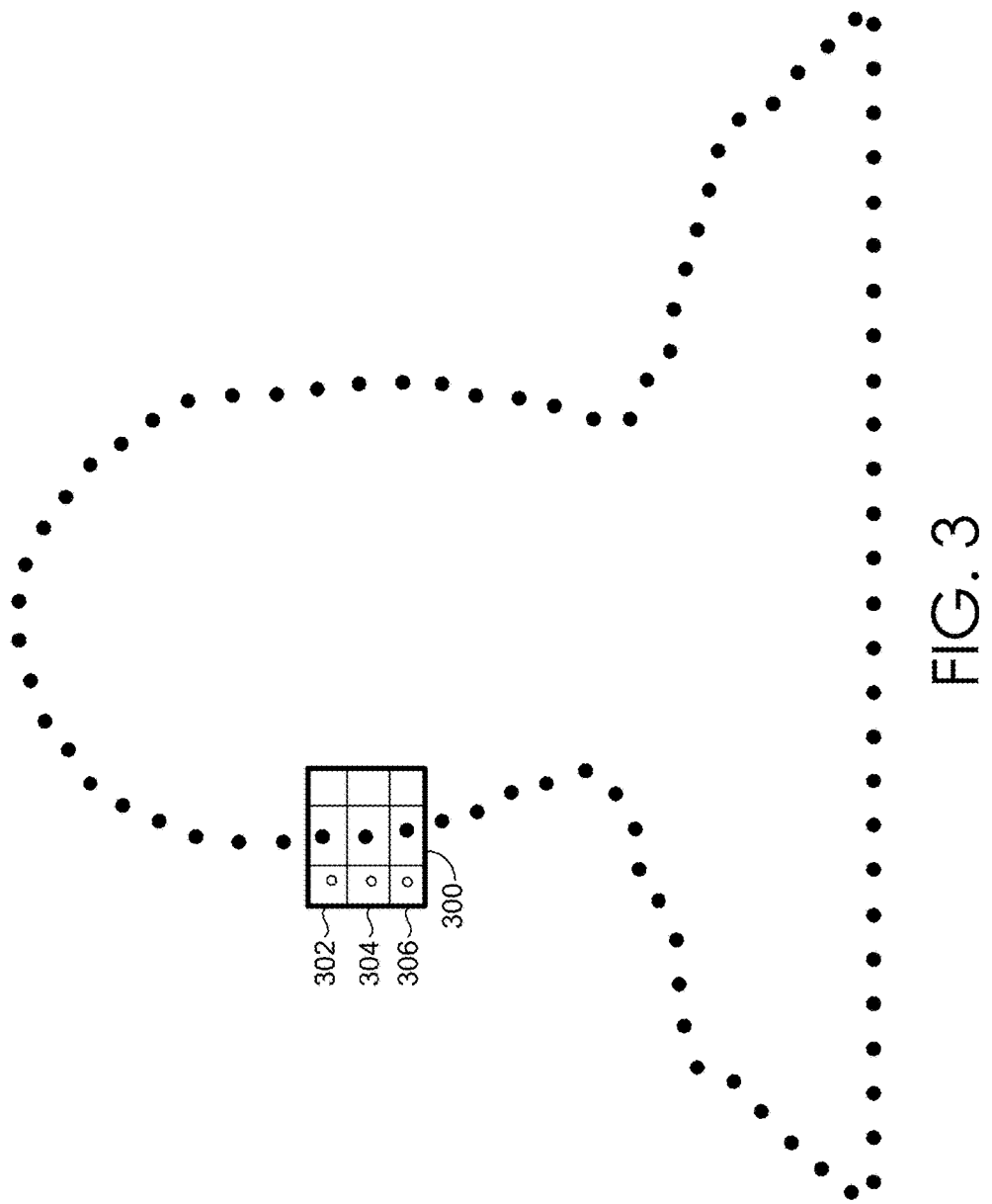
Figure 4:
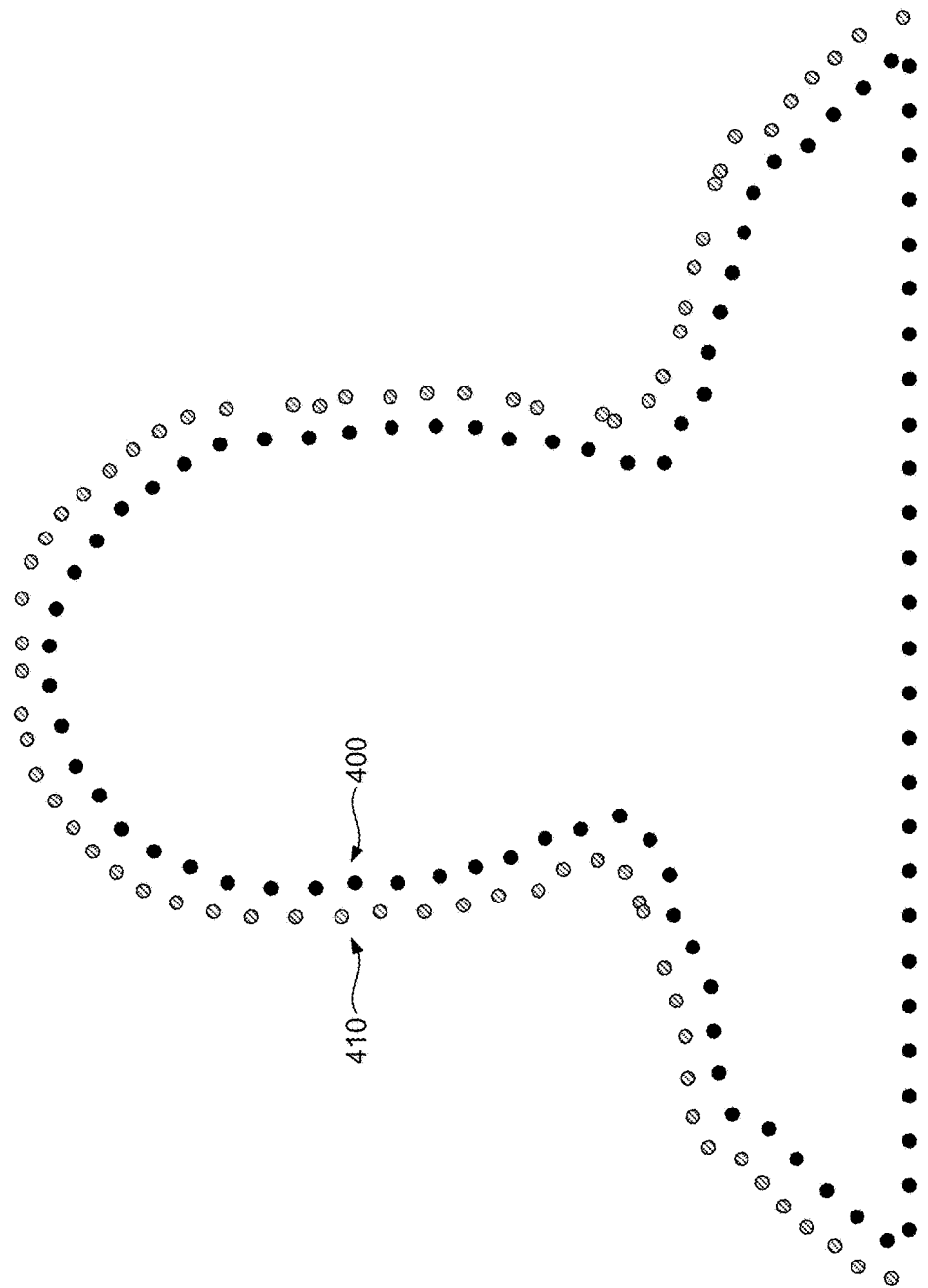

Referring next to FIG. 3, a grid 300 illustrates the immediate eight membered neighborhood of pixels. In this example, points are being generated in the background region first. As shown, the points in the grid 300 that are background points are points 302, 304, 306 are added to the first background contour of the band. In FIG. 4, the initial set of boundary points 400 is illustrated along with the first background contour 410 of the band.

Figure 5:
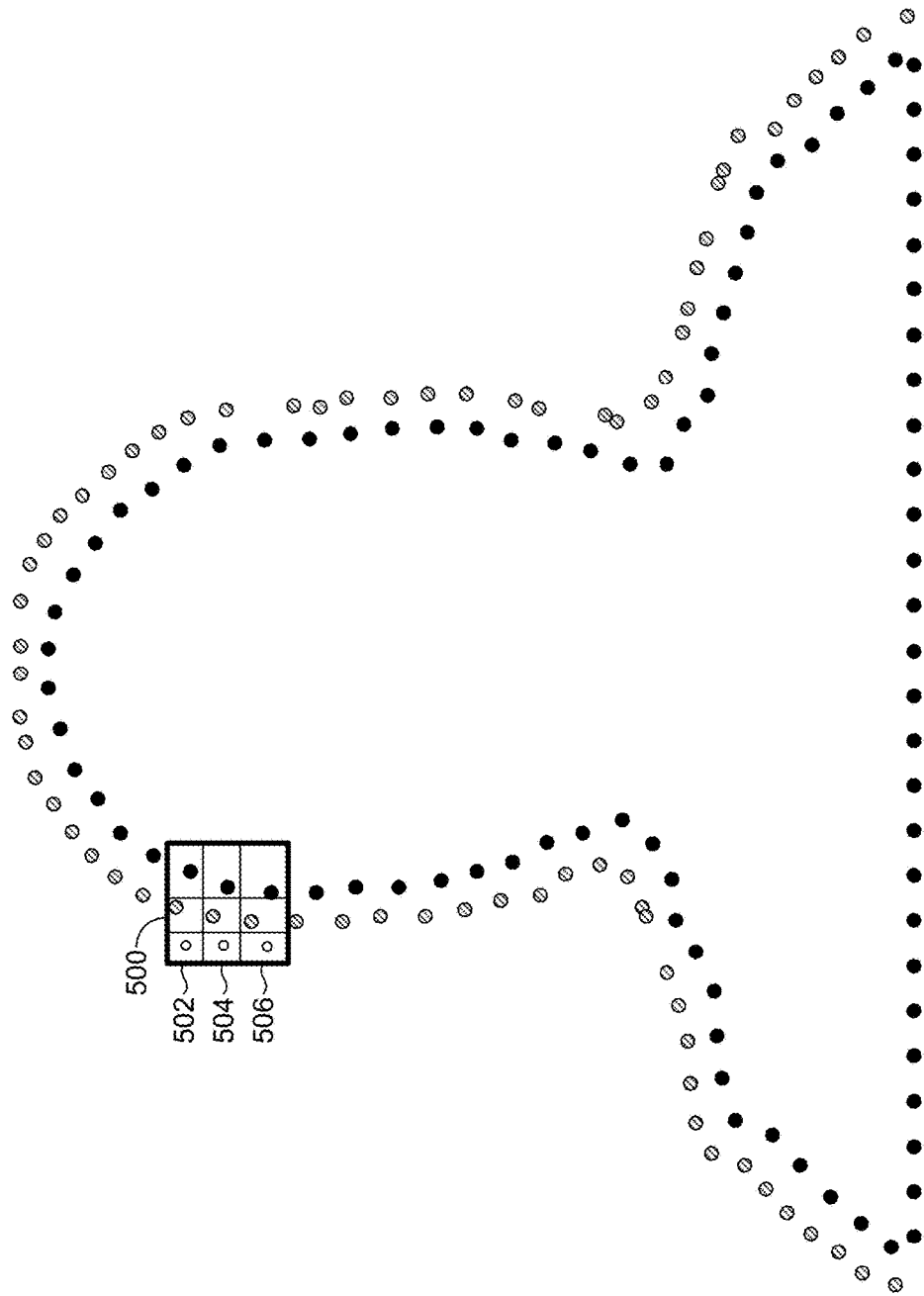
Figure 6:
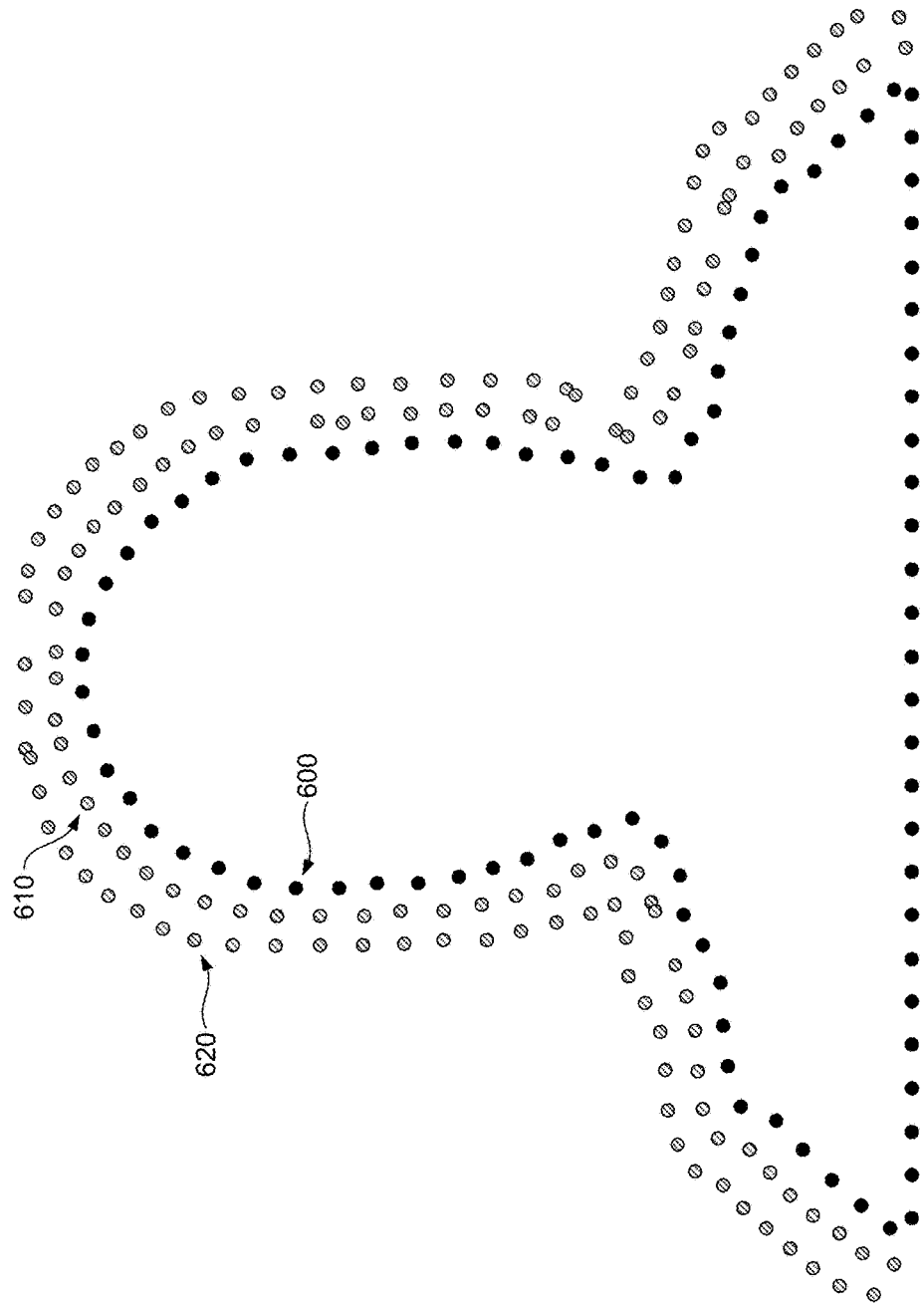
Figure 7:
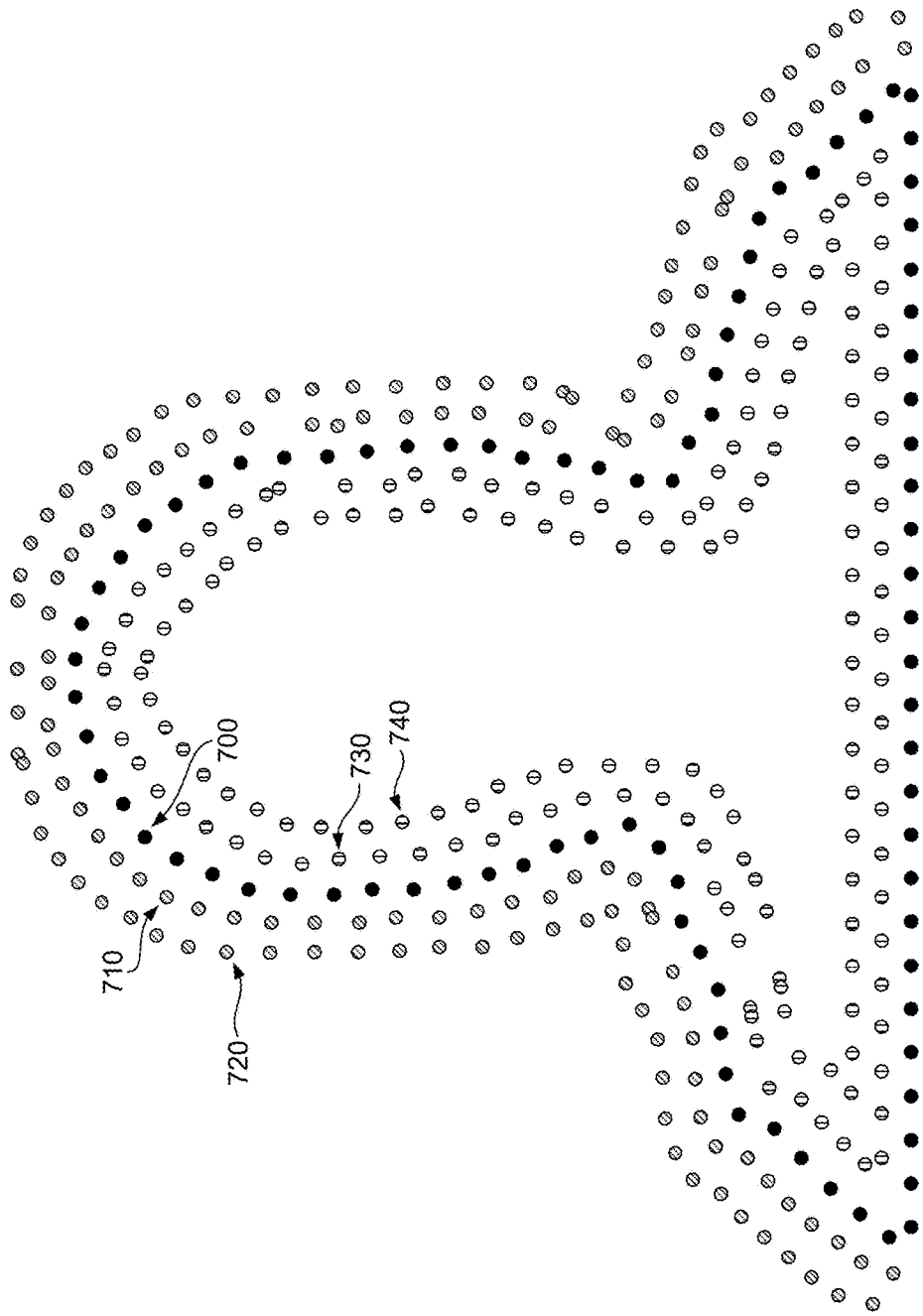

In FIG. 5, the grid 500 illustrates the immediate eight membered neighborhood of pixels that is utilized to generate the second background contour. As illustrated, the points in the grid 500 that are background points 502, 504, 506 are added to the second background contour of the band. In FIG. 6, the initial set of boundary points 600 is illustrated along with the first background contour 610 and the second background contour 620 of the band. FIG. 7 illustrates the complete band comprising the initial set of boundary points 700, the first background contour 710, the second background contour 720, the first foreground contour 730, and the second foreground contour 740.

Referring back to FIG. 2, the estimation component 122 is generally configured to estimate the background and foreground colors for each pixel in the band. This enables opacity to be calculated for each pixel generated by the boundary component 120, thereby enabling matting and despilling to be performed for each pixel. Initially, estimation component 122 begins at the outermost background contour and estimates the background color of each pixel as an average of the color of background points in the neighborhood of the pixel. For clarity, the neighborhood with respect to estimation for the outermost contour is defined as background points which are not in the band. For interior contours, the neighborhood with respect to estimation is defined as background points in the contour at the next contour (e.g., for the first background contour 710 of FIG. 7, the neighborhood of background points is the background points in the second background contour 720).

Figure 8:
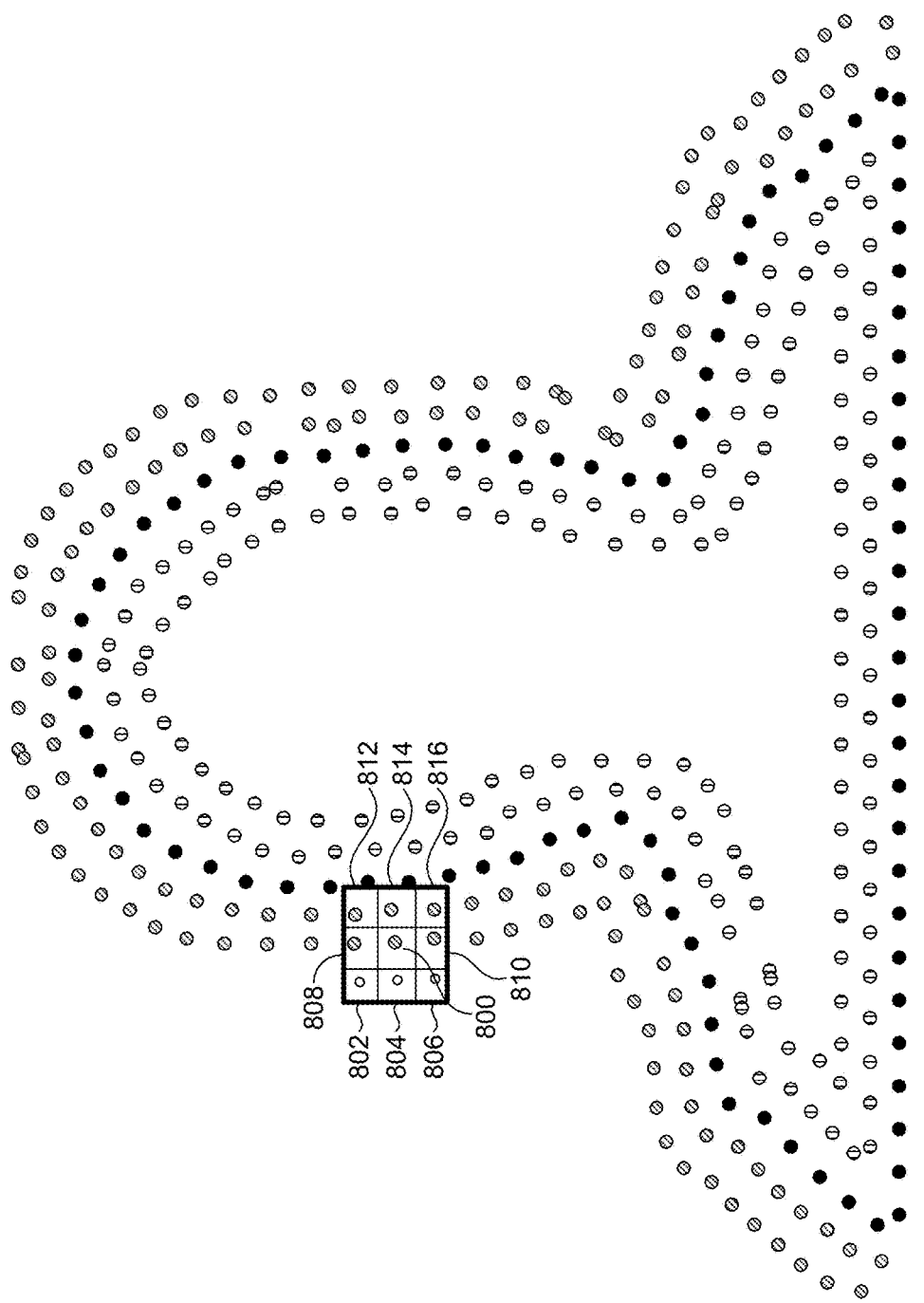

As shown in FIG. 8, the background color is being estimated as an average of neighboring background pixels for the outermost contour (i.e., pixel 800). In the outermost contour, pixels 808, 810, 812, 814, 816 that are in the band are not in the neighborhood of pixel 800. Estimation component 122 utilizes the average color of pixels 802, 804, 806 to estimate the background color of pixel 800. This estimation of the background color of pixel 800 can be applied by output component 124, as described below, to propagate the estimated background color to pixel 800.

Figure 9:
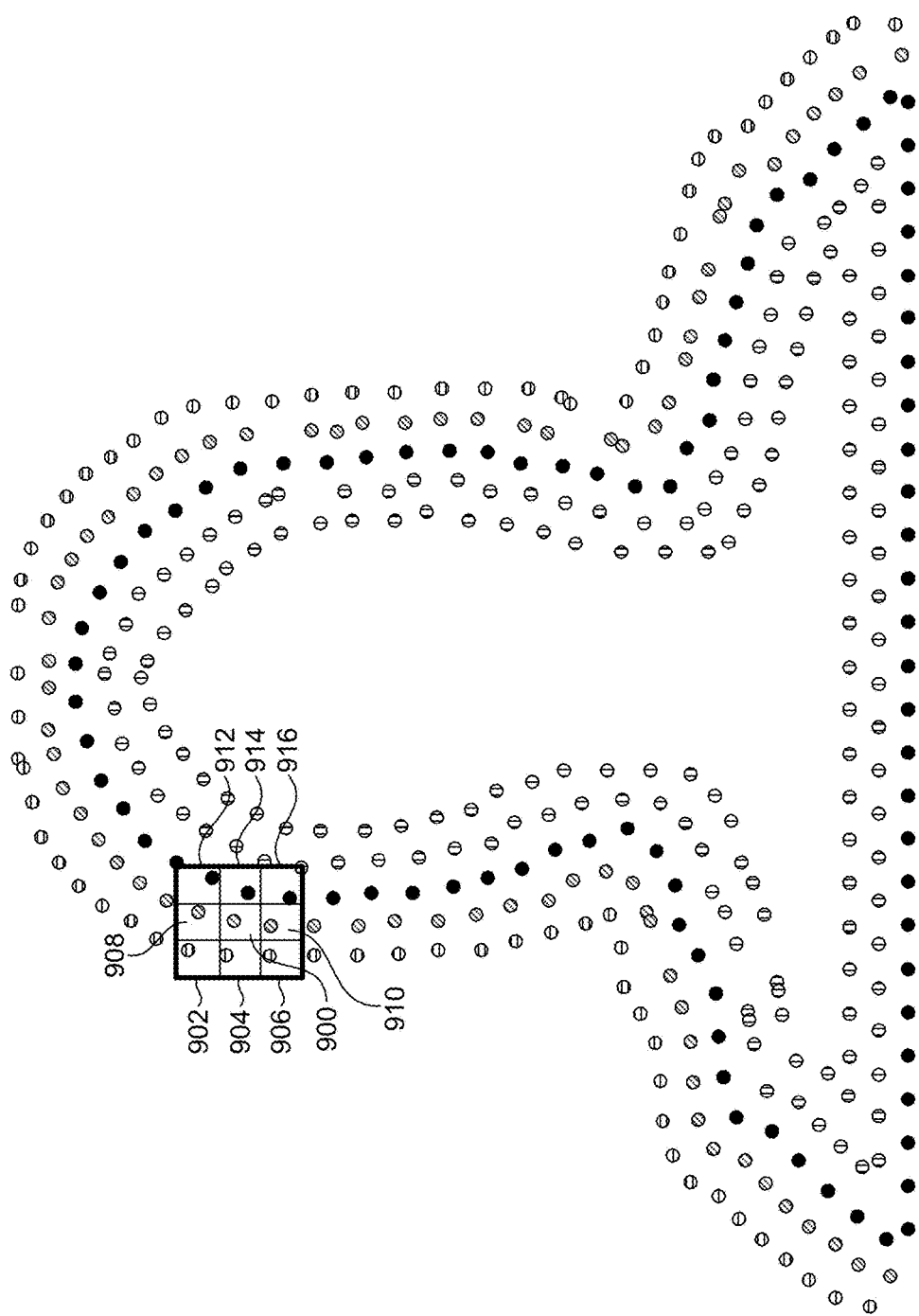

As shown in FIG. 9, the background color is being estimated as an average of neighboring background pixels for the next contour (i.e., pixel 900). For estimation of this contour, pixels 908, 910, 912, 914, 916 are not in the neighborhood of pixel 900. Estimation component 122 utilizes the average color of pixels 902, 904, 906 to estimate the background color of pixel 900. This estimation of the background color of pixel 900 can be applied by output component 124, as described below, to propagate the estimated background color to pixel 900. In a similar fashion, beginning at the contour closest to the initial set of boundary points, the background color of each contour point in the foreground contours is estimated.

Estimation component 122 estimates the foreground colors by initially beginning at the innermost foreground contour and moving towards the initial set of boundary points. The estimated foreground color for each pixel in the contour can be estimated as a linear combination of: 1) an average of the colors of foreground points in its neighborhood (for the innermost contour, the neighborhood is defined as foreground points which are not in the band; for interior contours, the neighborhood is defined as foreground points in the contour at the next contour (e.g., for the first foreground contour 730 of FIG. 7, the neighborhood of foreground points is the foreground points in the second foreground contour 730); and 2) an estimated color difference that is the difference in estimated background color for the pixel and the observed color of the pixel (a shifted foreground color is calculated by shifting the observed color in the direction of the color difference by an empirically decided factor. In some embodiments, the weight in the linear combination is empirically set to a default of 0.5 and is editable by the user.

Figure 10:
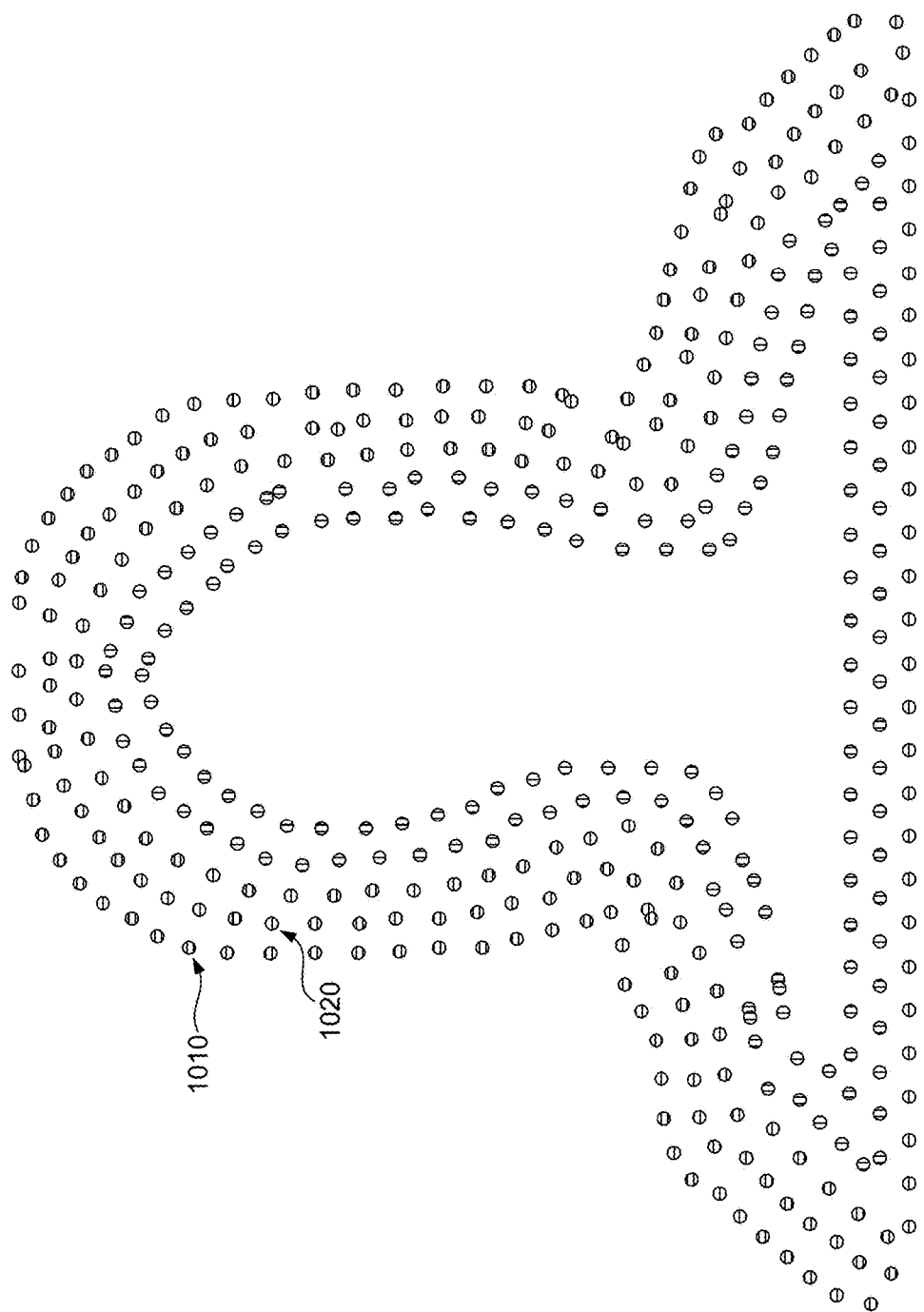
Figure 11:
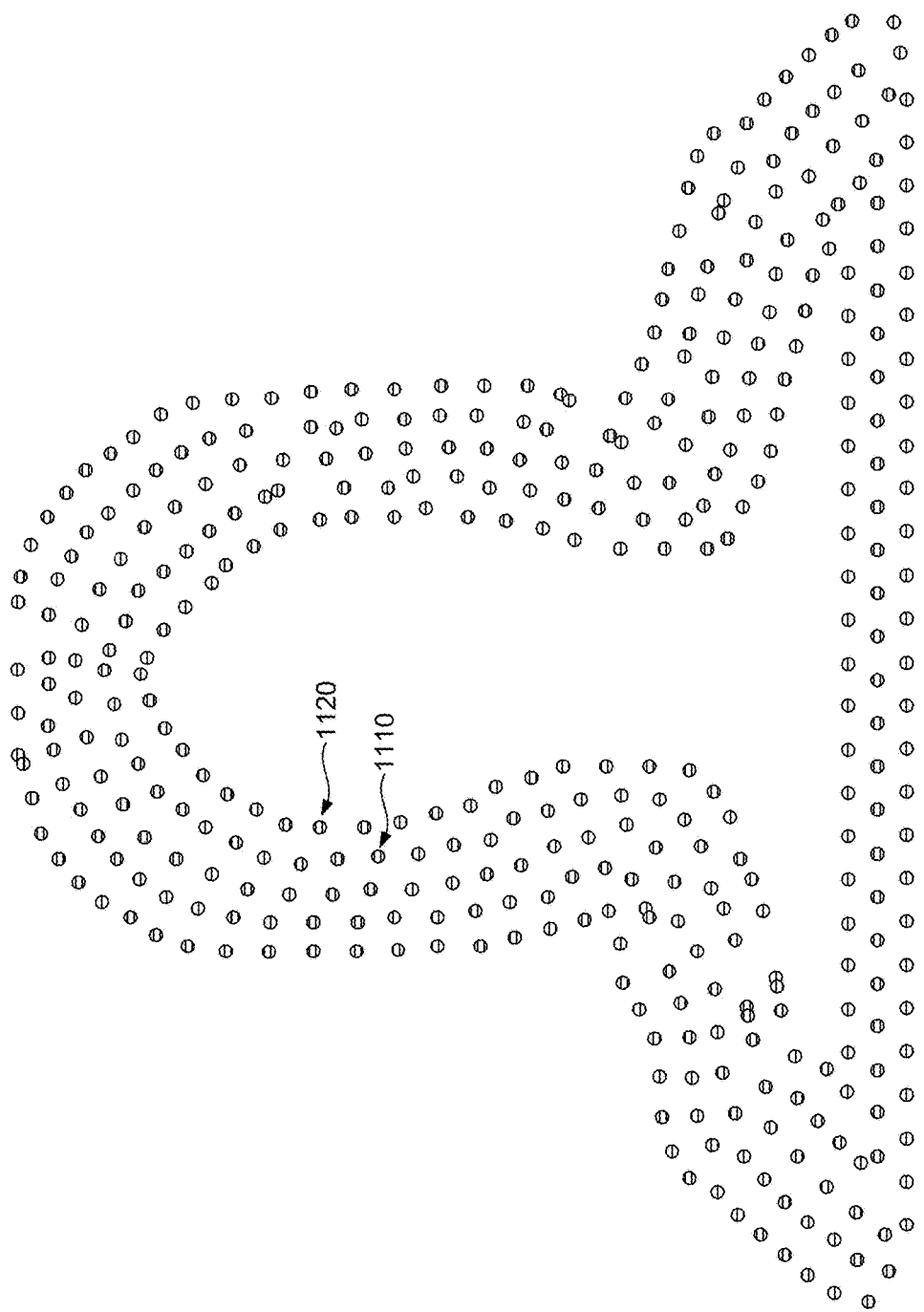

Referring back to FIG. 2, the output component 124 is generally configured to initially propagate the estimated background colors to each pixel in the band. As shown in FIGS. 10 and 11, the estimated background color has been applied to each of the background contours 1010, 1020 as well as each of the foreground contours 1110, 1120. The output component 124 is also generally configured to propagate the estimated foreground colors to each pixel in the band. The output component 124 performs despilling on the image by substituting the foreground color estimates in the matting band of the output image. After the despilling phase, the matte ($\alpha_1$) can be calculated by output component 124 by solving the matting equation: $I_i = \alpha_i F_i + (1-\alpha_i)\beta_i$, where $I_i$ refers to the observed color of the pixel. To solve the matting equation, the estimated foreground ($F_i$) and background values ($B_i$) are substituted in the equation.

Figure 12:
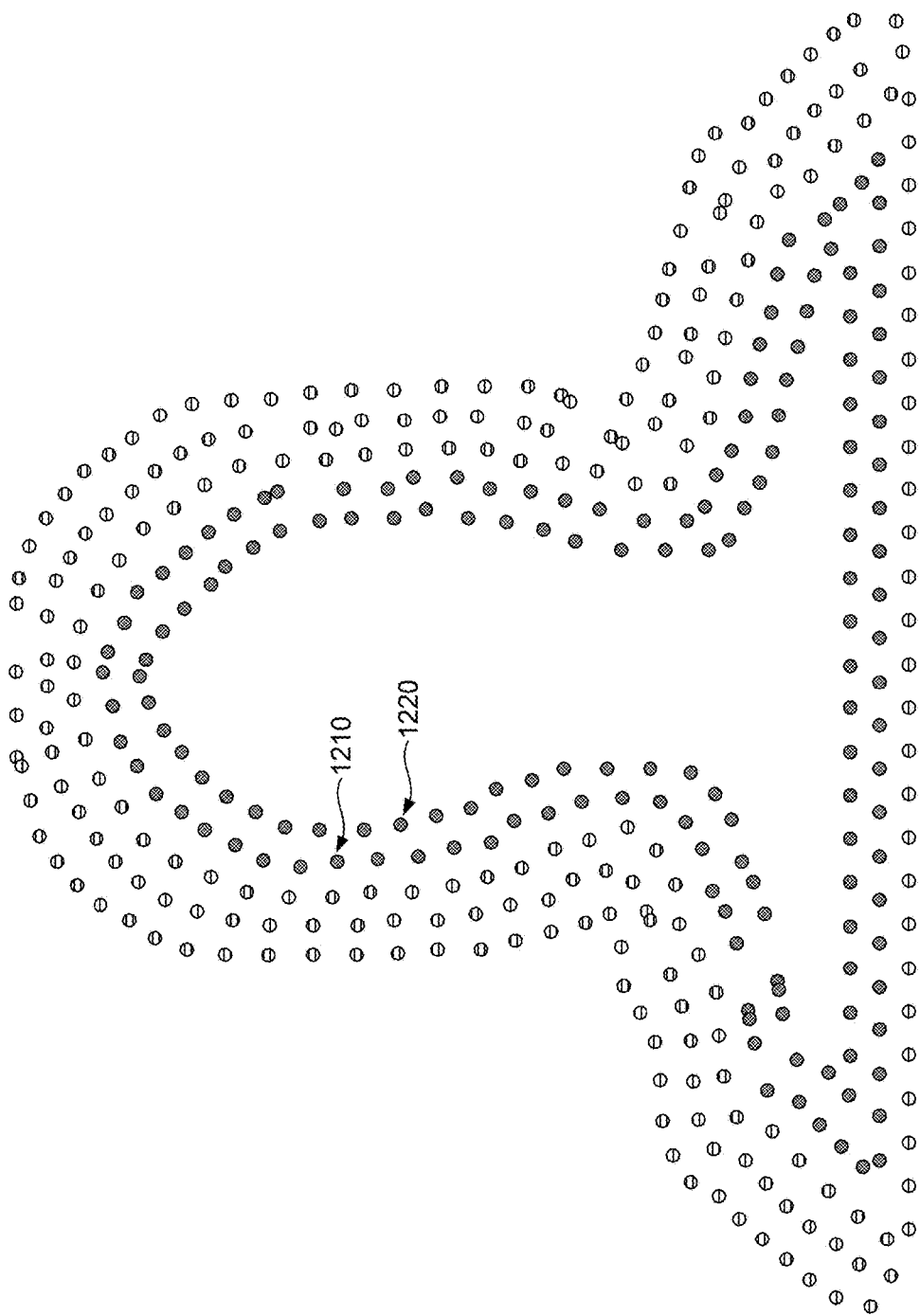
Figure 13:
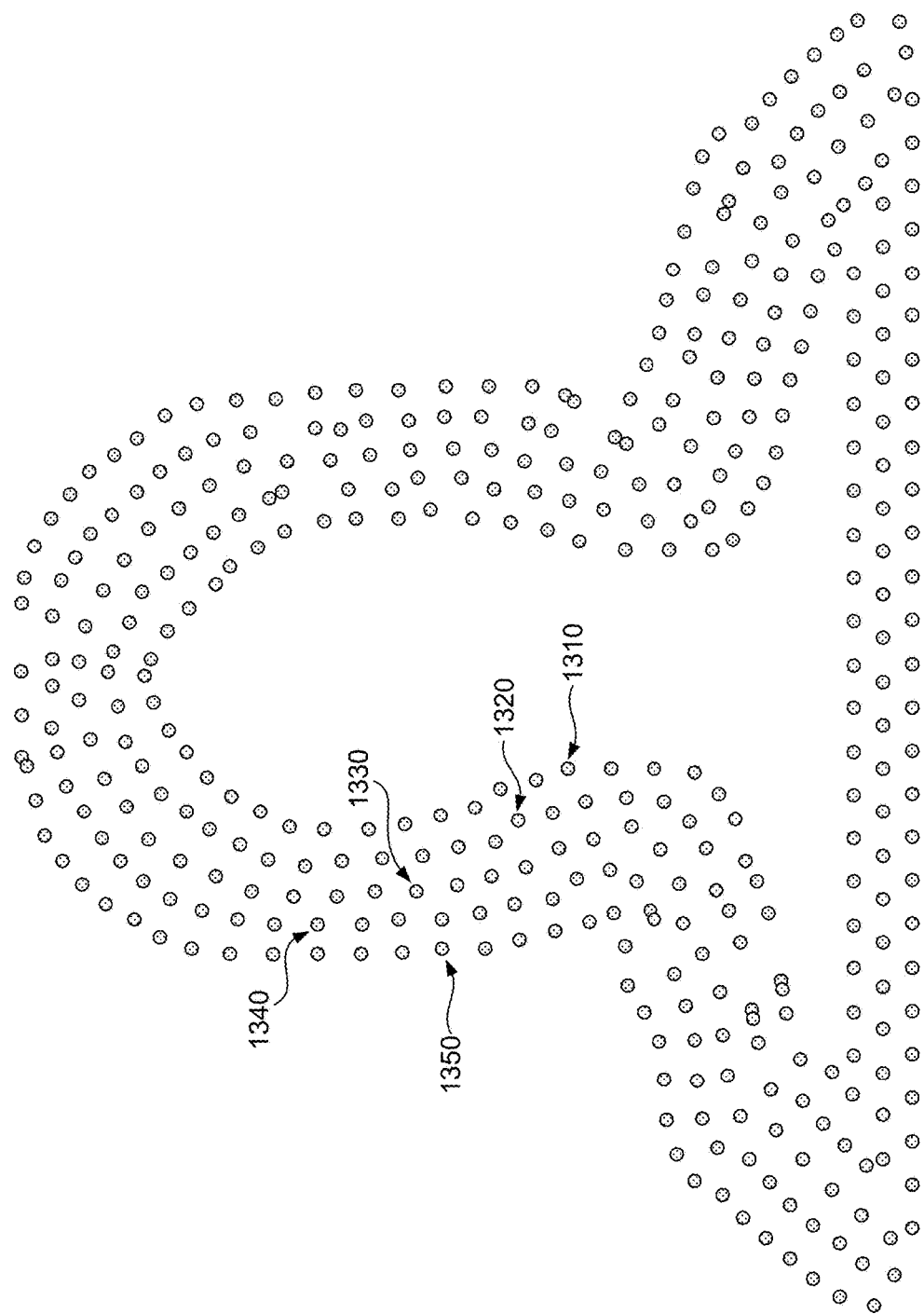

As shown in FIG. 12, the foreground colors have been estimated as a linear combination of a shifted color and an average color and have been propagated to each foreground contour 1210, 1220. In FIG. 13, the foreground colors have been estimated and propagated to each contour 1310, 1320, 1330, 1340, 1350.

Once the foreground and background colors have been propagated in this way and the matte is calculated using the matting equation, matting has been achieved in real-time, as described herein. This enables the image having the selected foreground object and the new background object to appear to have a boundary that is blended and smooth. In some embodiments, the quality of the real-time matting is improved when the background of the original image or video is solid colored in the vicinity around the foreground object (but can have other colored objects away from the foreground object), or in other words, on content with low spatial frequencies.

Figure 14:
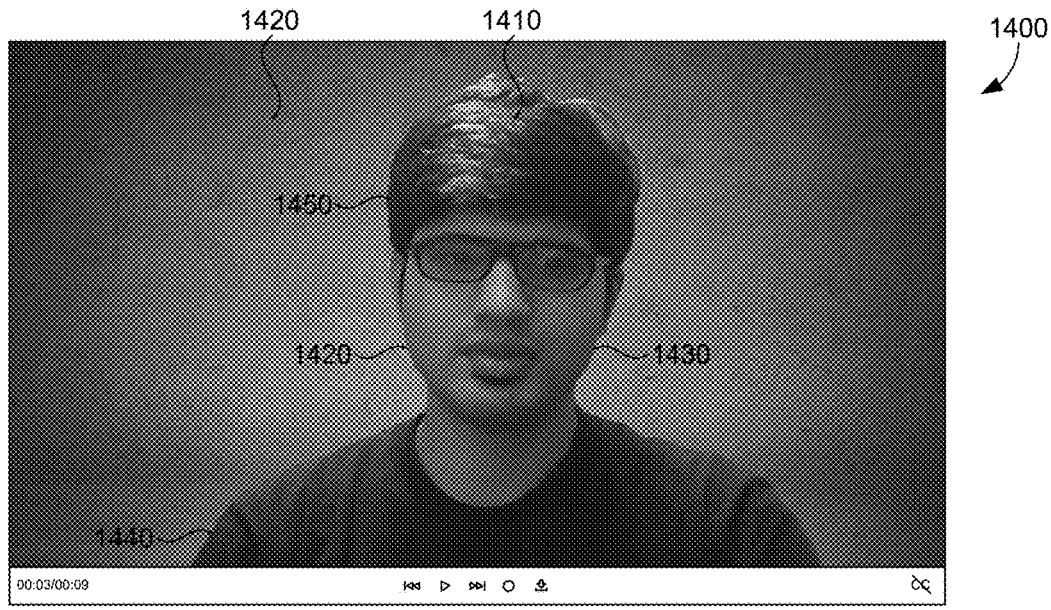
FIGS. 14 and 15 are exemplary images illustrating the difference between an unmated and a matted image, in accordance with embodiments of the present invention.
Figure 15:
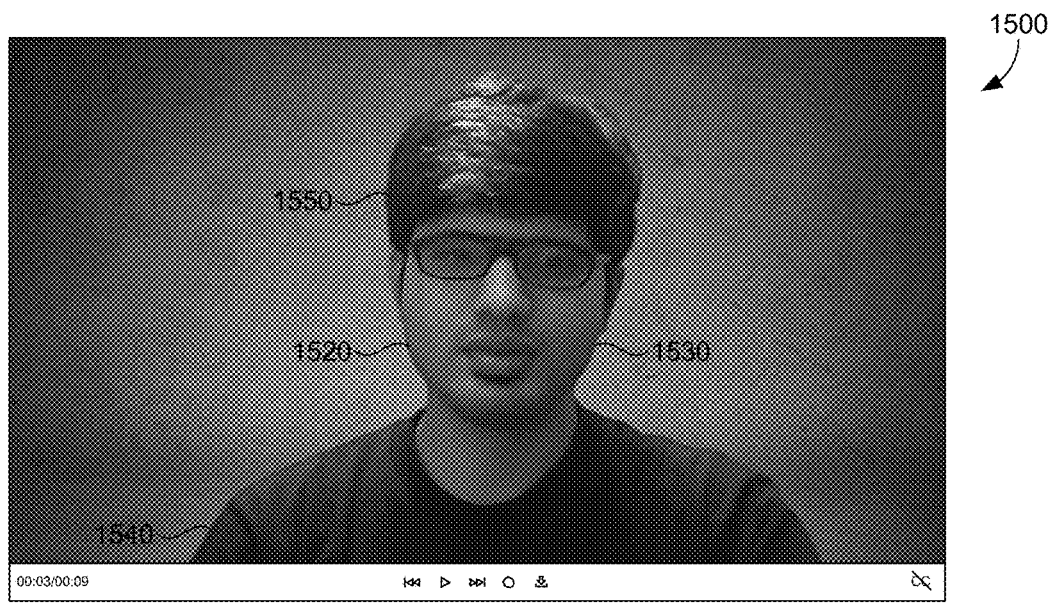

Referring next to FIGS. 14-15, illustrative screenshots 1400, 1500 are provided. In FIG. 14, a foreground object 1410 has been combined with a background 1420. As shown, the boundary between the foreground object 1410 and the background 1420 includes points 1420, 1430, 1440, 1450 that do not appear well blended or smooth. Turning to FIG. 15, after undergoing the real-time matting process, each of the illustrative troublesome points that appeared in the original combined image are now well blended and smooth points 1520, 1530, 1540, 1550.

Figure 16:
FIG. 16 is an exemplary screenshot showing a toolbar that can be utilized to define settings used to matte an image, in accordance with embodiments of the present invention.

In FIG. 16, an illustrative screenshot is provided that includes a customization tool 1610. The customization tool 1610 enables the user to define setting that control the matting and despilling process. In embodiments, an Edge Filter Radius tool enables the user to select a matting radius or the number of contours which are generated inside and outside the received segmentation boundary, a Matte Bias tool enables the user to select the weight used estimating the linear combination of a shifted color and an average color (as described herein), and/or a Despill Amount tool enables the user to select the weight used for calculating the shifted color (as described herein).

Figure 17:
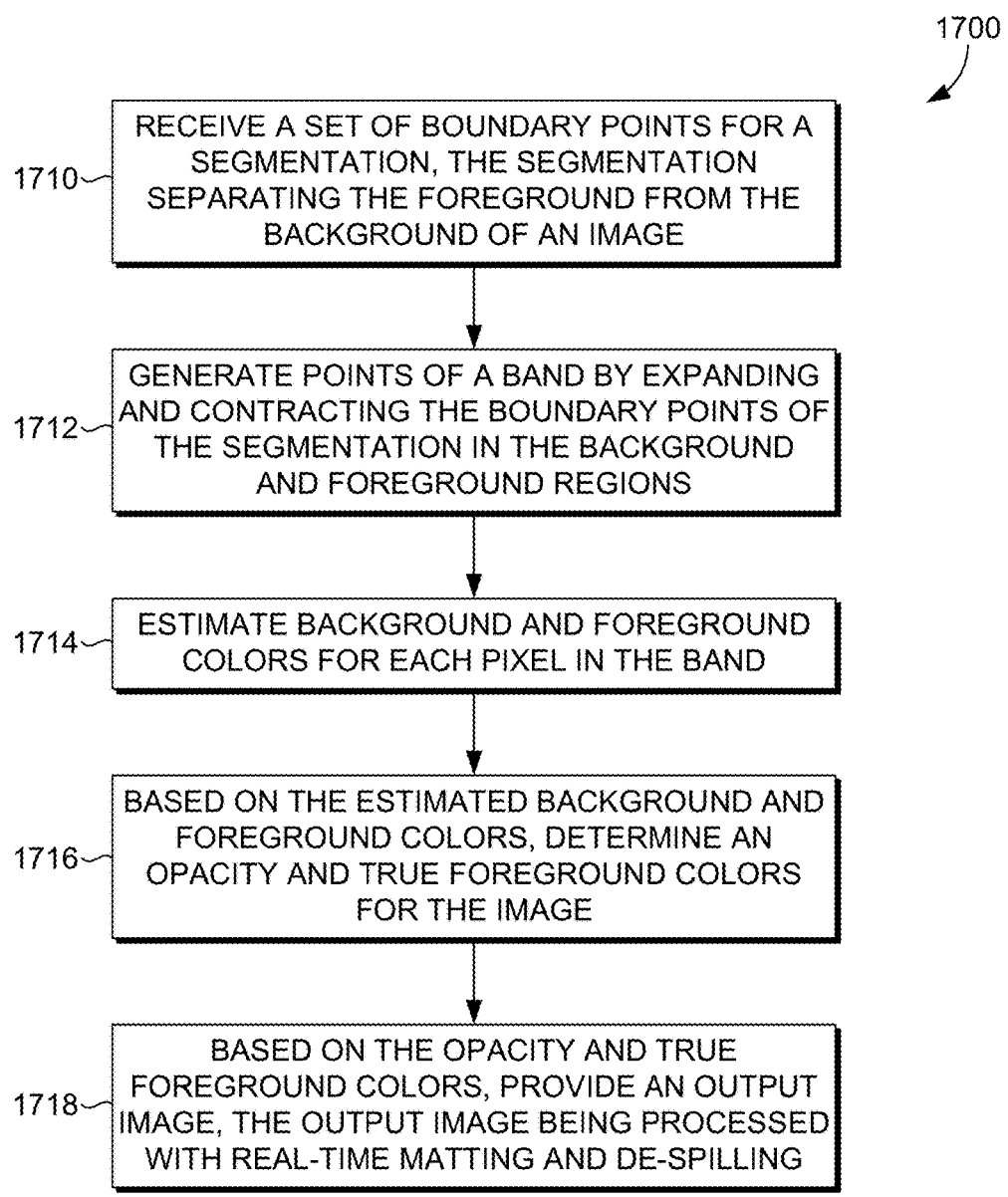
FIG. 17 is a flow diagram showing a method for facilitating real-time matting of an image, in accordance with embodiments of the present invention.

Turning now to FIG. 17, a flow diagram is provided that illustrates a method 1700 for facilitating real-time matting of an image, according to embodiments provided herein. Initially, at block 1710, a set of boundary points for a segmentation is received. The segmentation separates the foreground from the background of an image. The set of boundary points for the segmentation may represent a blend of background and foreground colors.

Points of a band are generated, at block 1712, by expanding and contracting the boundary points of the segmentation in the background and foreground regions. In some embodiments, a configurable matting radius is received from a user. The configurable matting radius defines the expanding and contracting of the boundary points in the background and foreground regions to generate points of the band. For example, the number of contours generated depends on the matting radius selected by the user. As described herein, the matting radius is two. However, it should be appreciated that the matting radius can be set to any desired number of contours. Initially, a first background contour level of neighboring background points may be generated. Next, a second background contour level of neighboring background points may be generated. Further, a first foreground contour level of neighboring foreground points may be generated. Finally, a second foreground contour level of neighboring foreground points may be generated.

At block 1714, background and foreground colors for each pixel in the band are estimated. To do so, an average of colors of background points in a neighborhood of each pixel may be estimated. The neighborhood may be a set of points adjacent to a particular pixel.

Based on the estimated background and foreground colors, an opacity and true foreground colors for the image are determined at block 1716. In embodiments, opacity and true foreground colors for the output image are determined based on the estimates of the background and foreground colors of the image. Based on the opacity and true foreground colors, an output image is provided at block 1718. The output image is processed with real-time matting.

Figure 18:
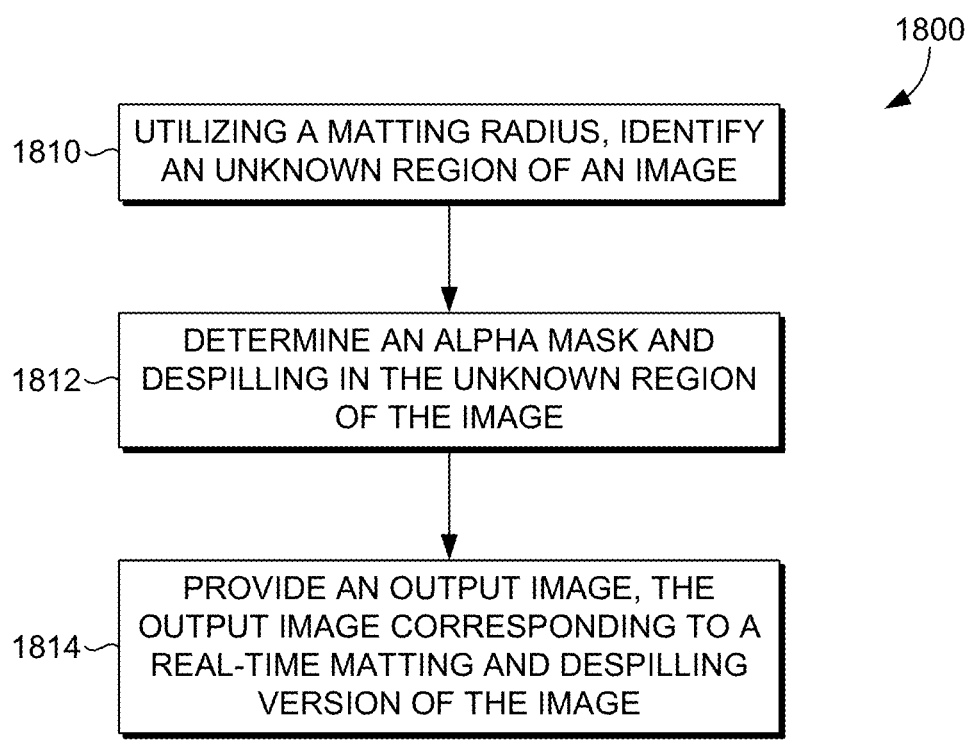
FIG. 18 is a flow diagram showing a method for facilitating real-time matting of an image, in accordance with embodiments provided herein.

With reference now to FIG. 18, a flow diagram is provided that illustrates a method 1800 for facilitating real-time matting of an image, according to embodiments provided herein. Initially, as indicated at block 1810, a matting radius is utilized that identifies an unknown region of an image. A set of boundary points may be received for a segmentation that separates the foreground from the background of an image. The matting radius may be utilized to generate points of a band by expanding and contracting the boundary points of the segmentation in the background and foreground regions. Background and foreground colors for each pixel in the band may be estimated. Background colors for each pixel in the band may be estimated based on an average of colors of background points in a neighborhood of each pixel. Based on the estimated background and foreground colors, true foreground colors for the image may be determined.

An alpha mask and despilling is determined, at block 1812, in the unknown region of the image. The alpha mask corresponds to an opacity in the unknown region of the image and is based on the estimated background and foreground colors for each pixel in the band. An output image corresponding to a real-time matting and despilling version of the image may be provided. The output image is based on the opacity and true foreground colors.

Figure 19:
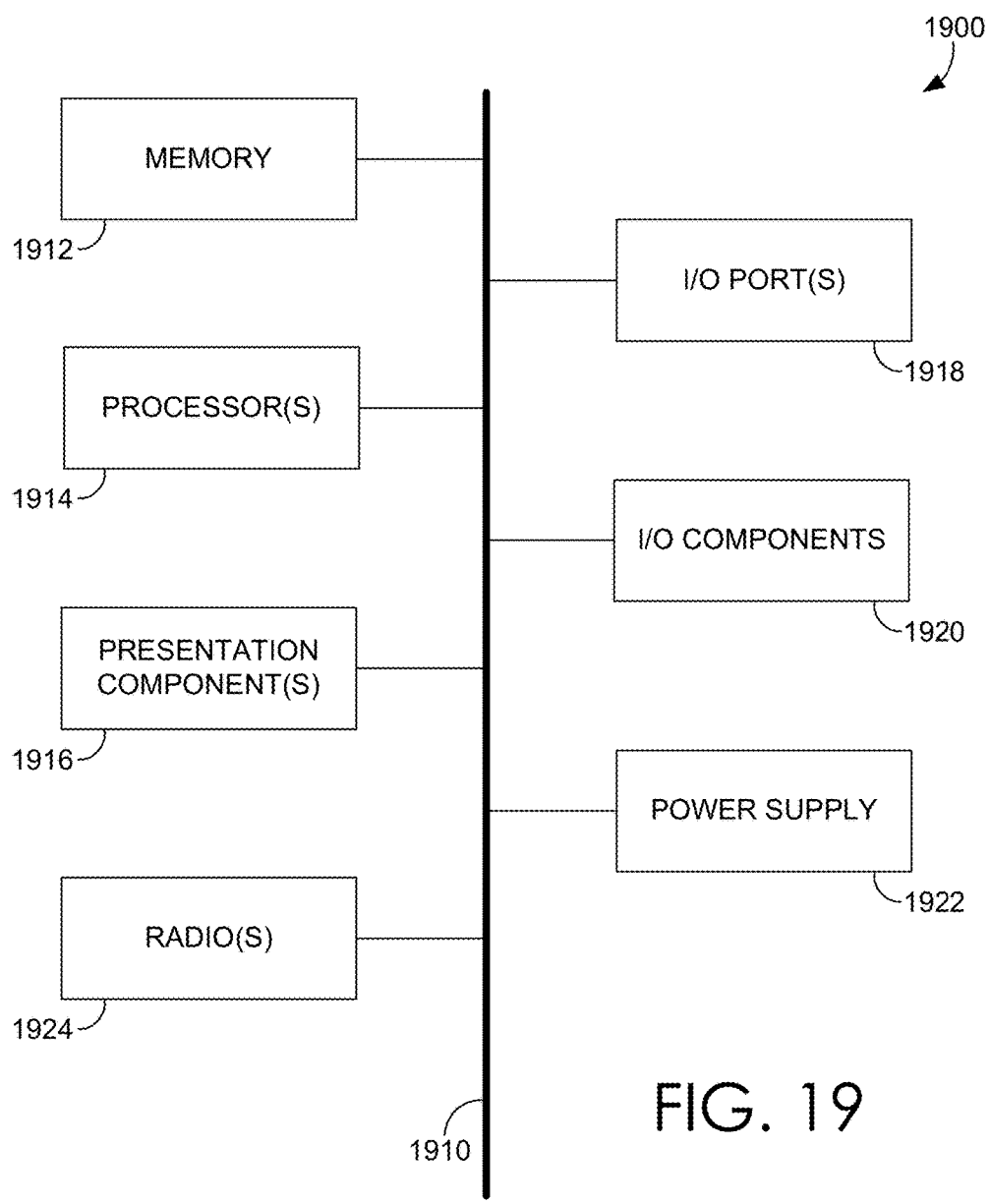
FIG. 19 is a block diagram of an exemplary computing device in which embodiments of the invention may be employed.

Having briefly described an overview of embodiments of the present invention, an exemplary operating environment in which embodiments of the present invention may be implemented is described below in order to provide a general context for various aspects of the present invention. Referring initially to FIG. 19 in particular, an exemplary operating environment for implementing embodiments of the present invention is shown and designated generally as computing device 1900. Computing device 1900 is but one example of a suitable computing environment and is not intended to suggest any limitation as to the scope of use or functionality of the invention. Neither should the computing device 1900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 19, computing device 1900 includes a bus 1910 that directly or indirectly couples the following devices: memory 1912, one or more processors 1914, one or more presentation components 1916, input/output (I/O) ports 1918, input/output components 1920, and an illustrative power supply 1922. Bus 1910 represents what may be one or more busses (such as an address bus, data bus, or combination thereof). Although the various blocks of FIG. 19 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 19 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 19 and reference to "computing device."

Computing device 1900 typically includes a variety of computer-readable media. Computer-readable media can be any available media that can be accessed by computing device 1900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1912 includes computer-storage media in the form of volatile and/or nonvolatile memory. The memory may be removable, non-removable, or a combination thereof. Exemplary hardware devices include solid-state memory, hard drives, optical-disc drives, etc. Computing device 1900 includes one or more processors that read data from various entities such as memory 1912 or I/O components 1920. Presentation component(s) 1916 present data indications to a user or other device. Exemplary presentation components include a display device, speaker, printing component, vibrating component, etc.

I/O ports 1918 allow computing device 1900 to be logically coupled to other devices including I/O components 1920, some of which may be built in. Illustrative components include a microphone, joystick, game pad, satellite dish, scanner, printer, wireless device, etc. The I/O components 1920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1900. The computing device 1900 may be equipped with depth cameras, such as stereoscopic camera systems, infrared camera systems, RGB camera systems, touchscreen technology, and combinations of these, for gesture detection and recognition. Additionally, the computing device 1900 may be equipped with accelerometers or gyroscopes that enable detection of motion. The output of the accelerometers or gyroscopes may be provided to the display of the computing device 1900 to render immersive augmented reality or virtual reality.

As can be understood, embodiments of the present invention provide for, among other things, facilitating real-time matting of an image. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to facilitate real-time matting of an image, the method comprising:
   receiving a set of boundary points for a segmentation, the segmentation separating the foreground from the background of an image;
   generating points of a band by expanding and contracting the boundary points of the segmentation in the background and foreground regions;
   estimating background and foreground colors for each pixel in the band; based at least on the estimated background and foreground colors, determining an opacity and true foreground colors for the image; and
   based at least on the opacity and true foreground colors, providing an output image, the output image being processed with real-time matting.

2. The one or more computer storage media of claim 1, further comprising determining opacity and true foreground colors for the output image based on the estimates of the background and foreground colors of the image.

3. The one or more computer storage media of claim 1, wherein the set of boundary points for the segmentation represents a blend of background and foreground colors.

4. The one or more computer storage media of claim 1, wherein generating points of the band comprises generating a first background contour level of neighboring background points.

5. The one or more computer storage media of claim 4, wherein generating points of the band comprises generating a second background contour level of neighboring background points.

6. The one or more computer storage media of claim 5, wherein generating points of the band comprises generating a first foreground contour level of neighboring foreground points.

7. The one or more computer storage media of claim 6, wherein generating points of the band comprises generating a second foreground contour level of neighboring foreground points.

8. The one or more computer storage media of claim 1, wherein estimating background colors for each pixel in the band comprises estimating an average of colors of background points in a neighborhood of each pixel.

9. The one or more computer storage media of claim 8, wherein the neighborhood is a set of points adjacent to a particular pixel.

10. The one or more computer storage media of claim 1, further comprising receiving a configurable matting radius from a user, the configurable matting radius defining the expanding and contracting of the boundary points in the background and foreground regions to generate points of the band.

11. A computer-implemented method to facilitate real-time matting of an image, the method comprising:
    utilizing a matting radius, identifying an unknown region of an image, wherein the matting radius is utilized to generate points of a band by expanding and contracting the boundary points of a segmentation that separates background and foreground regions of the image;
    determining an alpha mask and despilling in the unknown region of the image; and providing an output image, the output image corresponding to a real-time matting and despilling version of the image.

12. The method of claim 11 further comprising estimating background and foreground colors for each pixel in the band.

13. The method of claim 12, wherein the alpha mask corresponds to an opacity and matting in the unknown region of the image and is based on the estimated background and foreground colors for each pixel in the band.

14. The method of claim 13, further comprising, based on the estimated background and foreground colors, determining true foreground colors for the image.

15. The method of claim 14, wherein the output image is based on the opacity and true foreground colors.

16. The method of claim 11 wherein generating points of the band comprises:

generating a first background contour level of neighboring background points; generating a second background contour level of neighboring background points; generating a first foreground contour level of neighboring foreground points; and generating a second foreground contour level of neighboring foreground points.

17. The method of claim 13, wherein estimating background colors for each pixel in the band comprises estimating an average of colors of background points in a neighborhood of each pixel, the neighborhood being a set of points adjacent to a particular pixel.

18. The method of claim 11, further comprising receiving a set of boundary points for a segmentation, the segmentation separating the foreground from the background of an image.

19. A computerized system for facilitating real-time matting of an image, the system comprising:

a processor; and computer storage media storing computer-useable instructions that, when used by the processor, cause the processor to:

receive a set of boundary points for a segmentation, the segmentation separating the foreground from the background of an image;

generate points of a band by expanding and contracting the boundary points of the segmentation in the background and foreground regions;

estimate background and foreground colors for each pixel in the band;

based on the estimated background and foreground colors, determine an opacity and true foreground colors for the image; and based on the opacity and true foreground colors, provide an output image, the output image being processed with real-time matting.

* * * * *